(12) United States Patent
Girkin et al.

(10) Patent No.: US 6,257,378 B1
(45) Date of Patent: Jul. 10, 2001

(54) CALIPER FOR DISC BRAKE ASSEMBLY (75) Inventors: Robert I. Girkin, New Hudson; Anthony C. Evans, Novi; George S. Traub, New Hudson, all of MI (US)

(73) Assignee: Kelsey Hayes Company, Livonia, MI (US)

( * ) Notice: Subject to any disclaimer, the term of this patent is extended or adjusted under 35 U.S.C. 154(b) by 0 days.

(21) Appl. No.: 09/229,074

(22) Filed: Jan. 12, 1999

Related U.S. Application Data (63) Continuation of application No. PCT/US97/12167, filed on Jul. 11, 1997.
(60) Provisional application No. 60/021,717, filed on Jul. 12, 1996.

(51) Int. Cl.[7] .................................................. F16D 55/00
(52) U.S. Cl. ...................................... 188/73.31; 188/72.4
(58) Field of Search ............................ 188/73.38, 73.31, 188/73.36, 73.1, 71.1, 73.44, 73.45, 72.4

(56) References Cited

U.S. PATENT DOCUMENTS

| | | |
|---|---|---|
| 3,245,500 | 4/1966 | Hambling et al. . |
| 3,435,922 | 4/1969 | Schmid . |
| 3,734,243 | 5/1973 | Girauldon . |
| 4,072,214 | 2/1978 | Haraikawa et al. . |
| 4,509,619 * | 4/1985 | Baynes et al. ..................... 188/73.38 |
| 5,181,588 * | 1/1993 | Emmons ........................... 188/73.31 |
| 5,249,649 | 10/1993 | Emmons . |
| 5,535,856 * | 7/1996 | McCormick et al. ........ 188/73.36 X |
| 5,785,156 * | 7/1998 | Warwick et al. ............. 188/73.32 X |
| 5,957,245 * | 9/1999 | Anger et al. ........................ 188/71.1 |

FOREIGN PATENT DOCUMENTS

| | | |
|---|---|---|
| 1016565 | 1/1966 | (GB) . |
| 1155647 | 6/1969 | (GB) . |

* cited by examiner

*Primary Examiner*—Christopher P. Schwartz
*Assistant Examiner*—Melanie Talavera
(74) *Attorney, Agent, or Firm*—MacMillan, Sobanski & Todd, LLC (57) ABSTRACT

An improve structure for a caliper adapted for use in a vehicle disc brake assembly is preferably formed from aluminum and includes an inboard leg portion and an outboard leg portion interconnected by an intermediate bridge portion. The intermediate bridge portion defines a pair of opposed lateral sides. A recess is provided in each of the lateral sides of the intermediate bridge portion of the caliper. Each of the recesses defines a lower rib and an upper rib. The lower rib extends uninterrupted from the inboard leg portion to the outboard leg portion of the caliper. The upper rib extends uninterrupted and inwardly from the outboard leg portion to the inboard leg portion of the caliper and at an acute angle relative to the lower rib.

19 Claims, 7 Drawing Sheets

CALIPER FOR DISC BRAKE ASSEMBLY

This application claims benefit of Provisional application 60/021,717, filed Jul. 12, 1996 and is a CON of PCT/US97/12167 filed Jul. 11, 1997.

BACKGROUND OF THE INVENTION

This invention relates in general to vehicle disc brake assemblies and in particular to an improved structure for a caliper adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

In order to reduce the weight of the disc brake assembly, it is known to reduce the weight of the caliper assembly of the disc brake assembly. Specifically, it is known to reduce the weight of an associated caliper of the caliper assembly. However, during braking, the caliper must be sufficiently stiff to withstand the braking forces which are generated. Thus, it would be desirable to provide a reduced weight caliper structure which was simple and economical, yet sufficiently stiff to withstand braking forces.

SUMMARY OF THE INVENTION

This invention relates to an improved structure for a caliper adapted for use in a vehicle disc brake assembly. The caliper is preferably formed from aluminum and includes an inboard leg portion and an outboard leg portion interconnected by an intermediate bridge portion. The intermediate bridge portion defines a pair of opposed lateral sides. A recess is provided in each of the lateral sides of the intermediate bridge portion of the caliper. Each of the recesses defines a lower rib and an upper rib. The lower rib extends uninterrupted from the inboard leg portion to the outboard leg portion of the caliper. The upper rib extends uninterrupted and inwardly from the outboard leg portion to the inboard leg portion of the caliper and at an acute angle relative to the lower rib. As a result, a relatively lightweight caliper structure is provided.

Various objects and advantages of this invention will become apparent to those skilled in the art from the following detailed description of the preferred embodiments, when read in light of the accompanying drawings.

DETAILED DESCRIPTION OF TIE PREFERRED EMBODIMENTS

Figure 1:
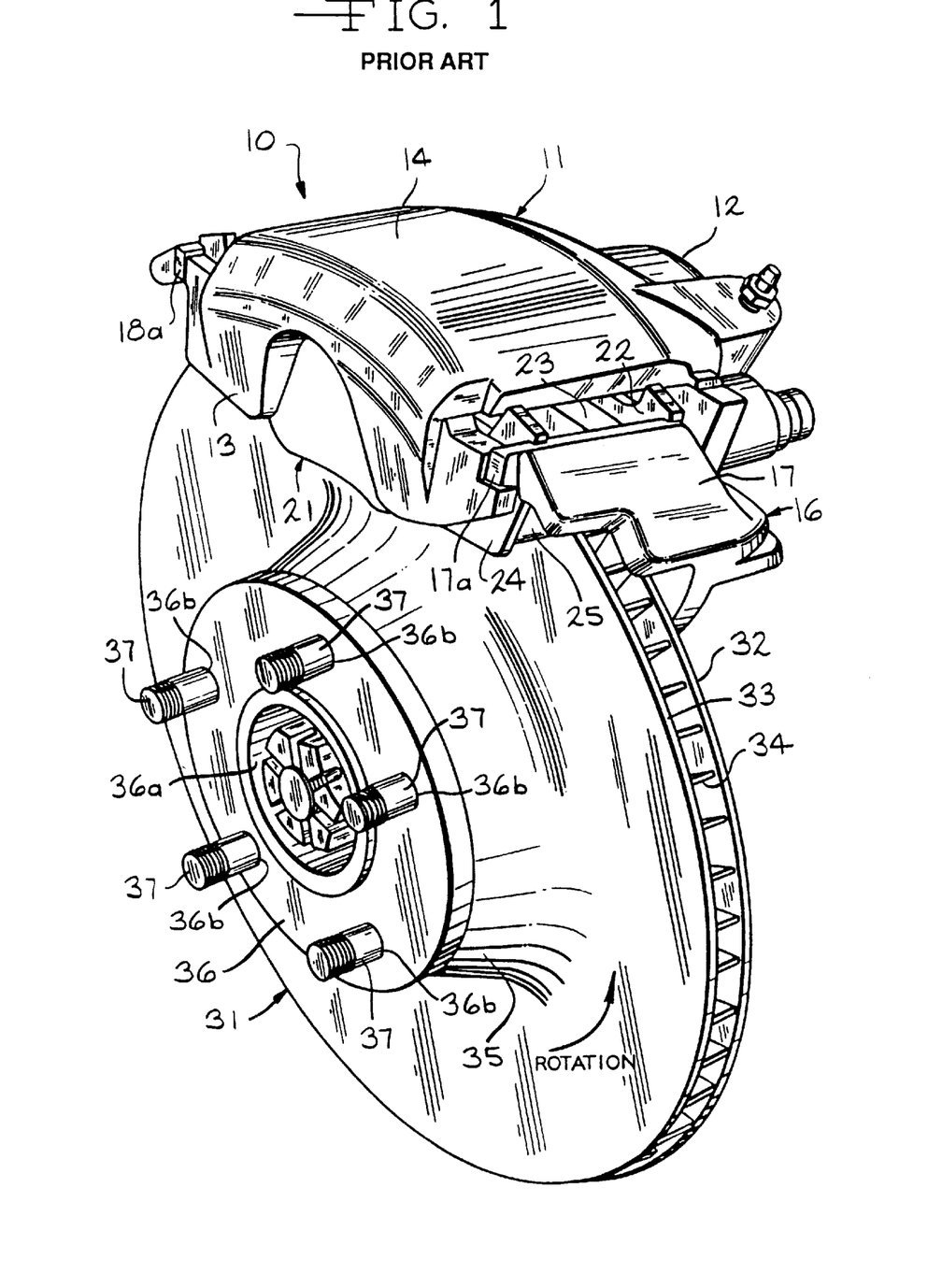
FIG. 1 is a perspective view of a portion of a prior art vehicle disc brake assembly.
Figure 2:
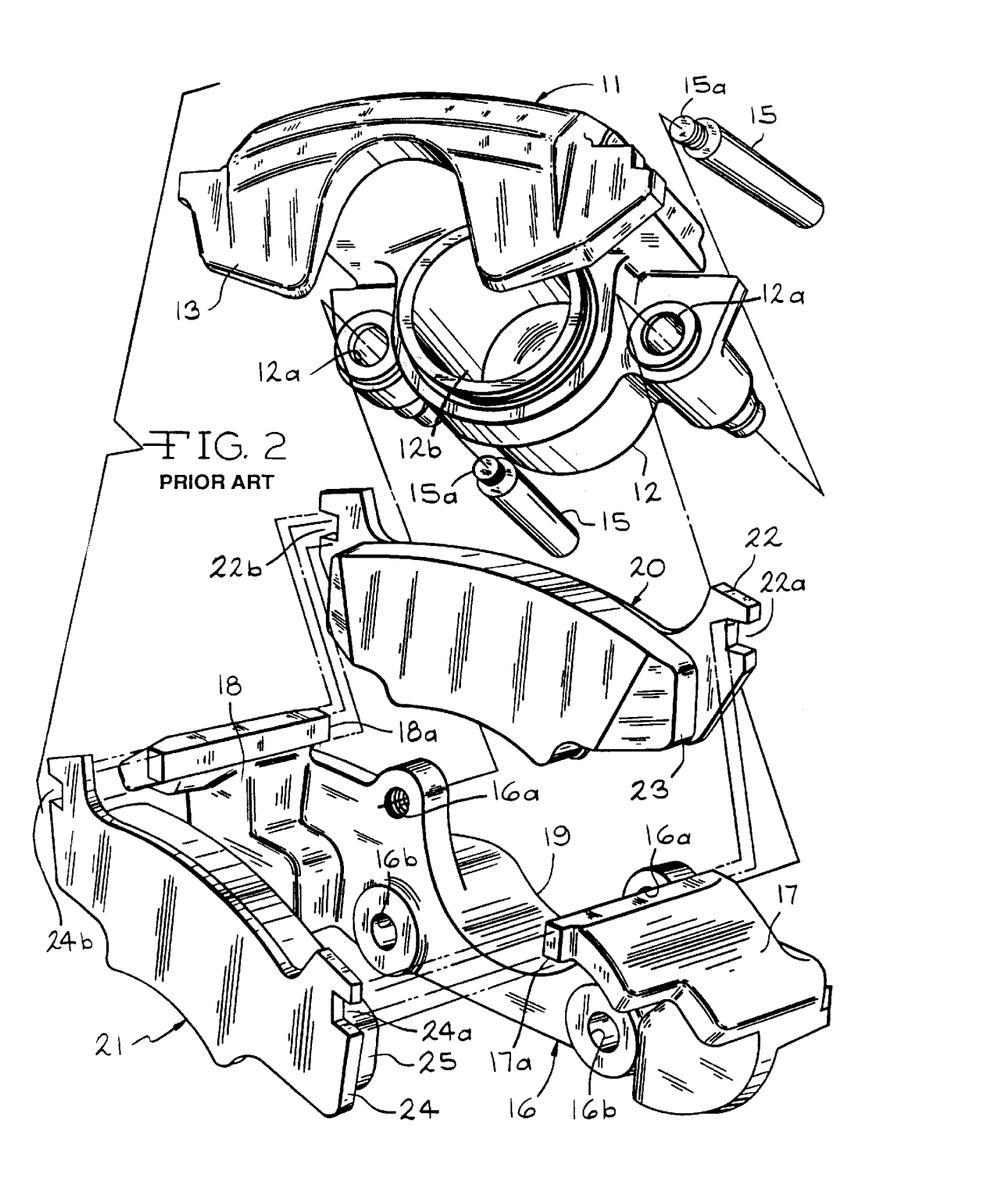
FIG. 2 is an exploded perspective view of a portion of the prior art disc brake assembly illustrated in FIG. 1.
Figure 3:
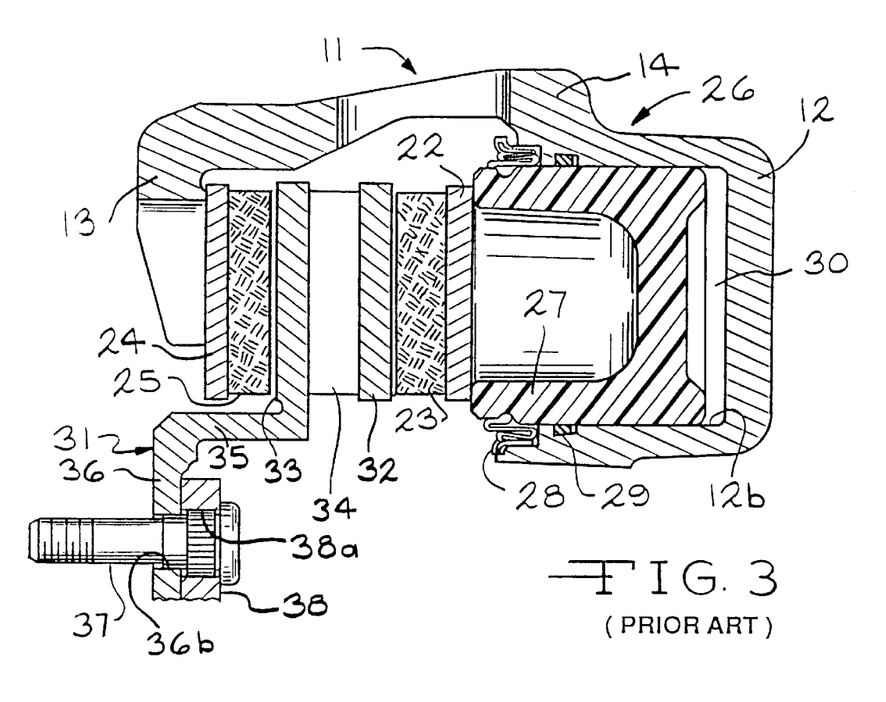
FIG. 3 is a sectional elevational view of a portion of the prior art disc brake assembly illustrated in FIG. 1.

Referring now to the drawings, there is illustrated in FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The disc brake assembly 10 includes a generally C-shaped caliper, indicated generally at 11. The caliper 11 includes an inboard leg portion 12 and an outboard leg portion 13 which are interconnected by an intermediate bridge portion 14. The caliper 11 is slidably supported on a pair of pins 15 secured to an anchor plate, indicated generally at 16 The pins 15 extend through respective non-threaded apertures 12a formed through the inboard leg 12 of the caliper 11. The pins 15 have threaded ends 15a which are received in respective threaded apertures 16a formed through the anchor plate 16. The pins 15 permit the caliper 11 to slide in both the outboard direction (toward the left when viewing FIG. 3) and the inboard direction (toward the right when viewing FIG. 3). Such sliding movement of the caliper 11 occurs when the disc brake assembly 10 is actuated, as will be explained below. A pair of bolts (not shown) extend through respective non-threaded apertures 16b formed through the anchor plate 16 to secure the anchor plate 16 to a stationary component of the vehicle, such as the steering knuckle (not shown) in a front wheel drive vehicle.

As best shown in FIG. 2, the illustrated anchor plate 16 includes a pair of outwardly extending arms 17 and 18 which are interconnected by an inner tie bar 19. The arms 17 and 18 have respective upstanding guide rails 17a and 18a, respectively formed thereon. The guide rails 17a and 18a extend transverse to the arms 17 and 18 and parallel to one another. The guide rails 17a and 18a are provided to slidably support an inboard brake shoe, indicated generally at 20, and an outboard brake shoe, indicated generally at 21, respectively.

The inboard brake shoe 20 includes a backing plate 22 and a friction pad 23. The opposed ends of the inboard backing plate 22 have notches 22a and 22b formed therein for supporting the inboard brake shoe 20 on the guide rails 17a and 18a of the anchor plate 16. The outboard brake shoe 21 includes a backing plate 24 and a friction pad 25. The opposed ends of the outboard backing plate 24 have notches 24a and 24b formed therein for supporting the outboard brake shoe 21 on the guide rails 17a and 18a of the anchor plate 16. Alternatively, as is known in the art, the inboard brake shoe 20 can be supported on a brake piston (not shown), while the outboard brake shoe 21 can be supported on the outboard leg portion 13 of the caliper 11.

An actuation means, indicated generally at 26 in FIG. 3, is provided for effecting The operation of the disc brake assembly 10. The illustrated actuation means 26 includes a piston 27 which is slidably disposed in a counterbore or recess 12b formed in the outboard surface of the inboard leg 12 of the caliper 11. The actuation means 26, shown in this embodiment as being a hydraulic actuation means, is operable to move the piston 27 in the outboard direction within the recess 12b (toward the left when viewing FIG. 3) when operated. However, other types of actuation means 26, such as electrical and mechanical types, can be used.

The disc brake assembly 10 also includes a dust boot seal 28 and an annular fluid seal 29. The dust boot seal 28 is formed from a flexible material and has a first end which engages an outboard end of the recess 12b. A second end of the dust boot seal 28 engages an annular groove formed in an outer side wall of the piston 27. A plurality of flexible convolutions are provided in the dust boot seal 28 between the first and second ends thereof. The dust boot seal 28 is provided to prevent water, dirt, and other contaminants from entering into the recess 12b. The fluid seal 29 is disposed in an annular groove formed in a side wall of the recess 12b and engages the outer side wall of the piston 27. The fluid seal 29 is provided to define a sealed hydraulic actuator chamber 30, within which the piston 27 is disposed for sliding movement. Also, the fluid seal 29 is designed to function as a "roll back" seal to retract the piston 27 within the recess 12b (toward the right when viewing FIG. 3) when the brake pedal is released.

The disc brake assembly 10 further includes a rotor, indicated generally at 31, which is connected to a hub 38 and a wheel (not shown) of the vehicle for rotation therewith. The illustrated rotor 31 is ventilated and includes a pair of opposed friction plates 32 and 33 which are spaced apart from one another by a plurality of intermediate ribs or posts 34 in a known manner. The rotor 31 extends radially outwardly between the inboard friction pad 23 and the outboard friction pad 25. The entire rotor 31, including the two friction plates 32 and 33 and the intermediate ribs 34, may be cast as a single piece.

The rotor 31 further includes an inner mounting flange portion 36 connected to the friction plate 33 by a circumferential wall or hat portion 35. The inner mounting flange portion 36 includes a centrally located pilot hole 36a which defines an axis of rotation for the rotor 31. A plurality of lug bolt receiving holes 36b (five of such lug bolt receiving holes 36b are shown in FIG. 1) are equally spaced circumferentially on the rotor 31 about the pilot hole 36a. A lug bolt 37 extends through a hole 38a provided in a hub 38, and through each of the lug bolt receiving holes 36b for mounting and securing the rotor 31 to the hub 38 and vehicle wheel for rotation therewith.

When it is desired to actuate the disc brake assembly 10 to slow or stop the rotation of the rotor 31 and the vehicle wheel associated therewith, the driver of the vehicle depresses the brake pedal (not shown). In a manner which is well known in the art, the depression of the brake pedal causes pressurized hydraulic fluid to be introduced into the chamber 30. Such pressurized hydraulic fluid urges the piston 27 in the outboard direction (toward the left when viewing FIG. 3) into engagement with the backing plate 22 of the inboard brake shoe 20. As a result, the friction pad 23 of the inboard brake shoe 20 is moved into frictional engagement with the inboard friction plate 32 of the rotor 31. At the same time, the caliper 11 slides on the pins 15 in the inboard direction (toward the right when viewing FIG. 3) such that the outboard leg 13 thereof moves the friction pad 25 of the outboard brake shoe 21 into frictional engagement with the outboard friction plate 33 of the rotor 31. As a result, the opposed friction plates 32 and 33 of the rotor 31 are frictionally engaged by the friction pads 23 and 25. The structure and operation of the disc brake assembly 10 thus far described is conventional in the art.

Figure 4:
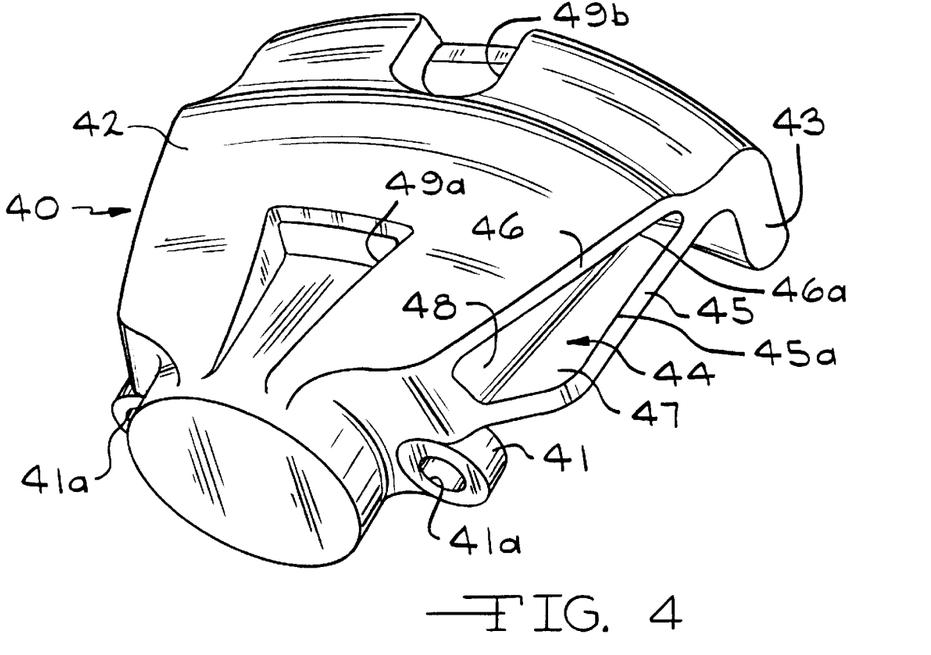
FIG. 4 is a rear perspective view of a first embodiment of an improved structure for a caliper in accordance with this invention.
Figure 5:
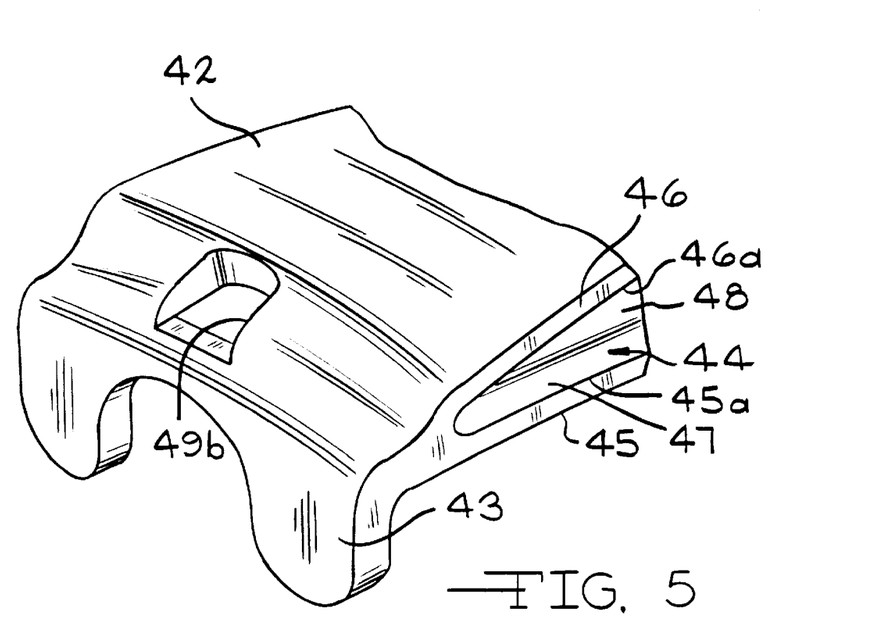
FIG. 5 is a front perspective view of a portion of the caliper illustrated in FIG. 4.

Turning now to FIGS. 4 and 5, there is illustrated a first embodiment of an improved structure for a caliper, indicated generally at 40, in accordance with this invention which can be used in place of the conventional caliper 11 of the prior art disc brake assembly 10 illustrated in FIGS. 1 through 3. Although the caliper 40 of this invention will be described and illustrated in conjunction with the particular prior art vehicle disc brake assembly 10 structure disclosed herein, it will be appreciated that it may be used in conjunction with other disc brake assembly structures.

The caliper 40 is preferably formed from aluminum or alloys thereof and includes an inboard leg portion 41 and an outboard leg portion 43 which are interconnected by an intermediate bridge portion 42. Alternatively, the caliper 40 can be formed from other metals, such as nodular iron, or a combination of two different metals, such as for example, an aluminum based metal matrix composite (MMC) containing silicon carbide particulate reinforcement and aluminum. The inboard leg portion 41 of the caliper 40 includes a pair of non-threaded apertures 41a formed therethrough. In a manner similar to that discussed above, the apertures 41a are adapted to receive pins (not shown) for slidably supporting the caliper 40 relative to the anchor plate (not shown).

The caliper 40 includes a pair of cavities or recesses, indicated generally at 44, formed in the opposed lateral sides thereof. Each of the recesses 44 has a generally triangular-like shape and extends from the inboard leg portion 41 to the outboard leg portion 43 of the caliper 40. Each of the recesses 44 defines a lower rib 45, an upper rib 46, a first surface 47, and a second surface 48.

The lower rib 45 has a generally rectangular cross-section of a generally constant thickness and extends uninterrupted from the inboard leg portion 41 to the outboard leg portion 43 of the caliper 40. The upper rib 46 has a generally rectangular cross-section of a generally constant thickness and extends uninterrupted and inwardly from the outboard leg portion 43 to the inboard leg portion 41 of the caliper 40. Alternatively, the shape and/or the thickness of one or both of the ribs 45 and 46 can be other than illustrated.

The upper rib 46 defines an lower edge 46a, and the lower rib 45 defines an upper edge 45a. The lower edge 46a of the upper rib 46 extends at an acute angle relative to the upper edge 45a of the lower rib 45 and opens outwardly from the outboard leg portion 43 to the inboard leg portion 41 of the caliper 40. Alternatively, the lower edge 46a of the upper rib 46 can extend generally parallel to the upper edge 45a of the lower rib 45. The first surface 47 has a generally triangular shape and extends inwardly into the side of the caliper 40 from the upper edge 45a of the lower rib 45. The second surface 48 has a generally triangular shape and extends inwardly into the side of the caliper 40 from the lower edge 46a of the upper rib 46. In this embodiment, the upper rib 46 projects outwardly over the first surface 47 of the recess 44.

The caliper 40 further includes an opening 49a and an opening 49b formed therein. The opening 49a extends from the inboard leg portion 41 of the caliper 40 into the intermediate bridge portion 42 thereof. The opening 49b is formed in the intermediate bridge portion 42 of the caliper 40 adjacent the outboard leg portion 43 thereof and extends into the outboard leg portion 43. Alternatively, the shape of one or both of the openings 49a and 49b can be other than illustrated.

Figure 6:
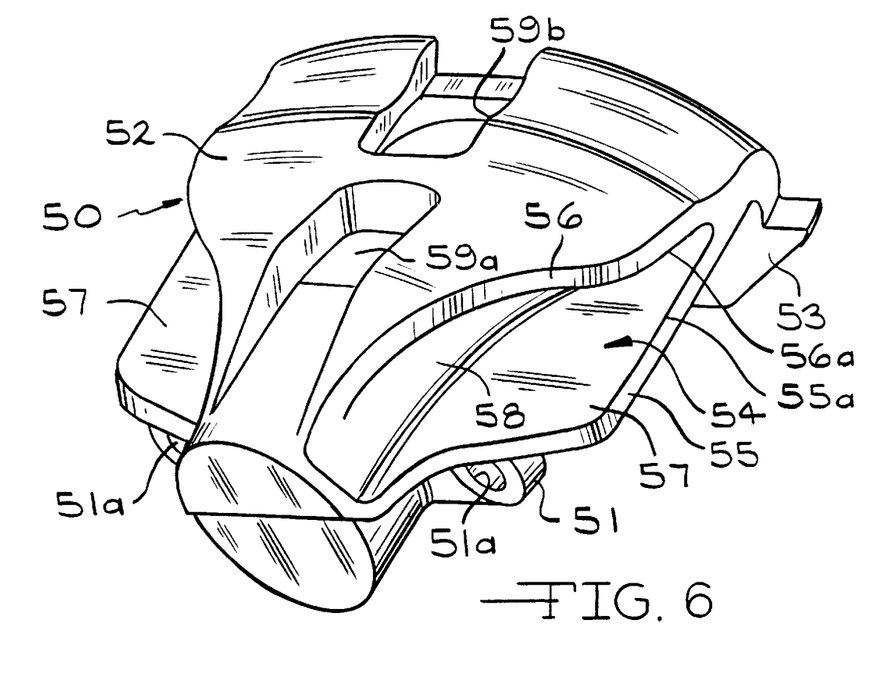
FIG. 6 is a rear perspective view of a second embodiment of an improved structure for a caliper in accordance with this invention.
Figure 7:
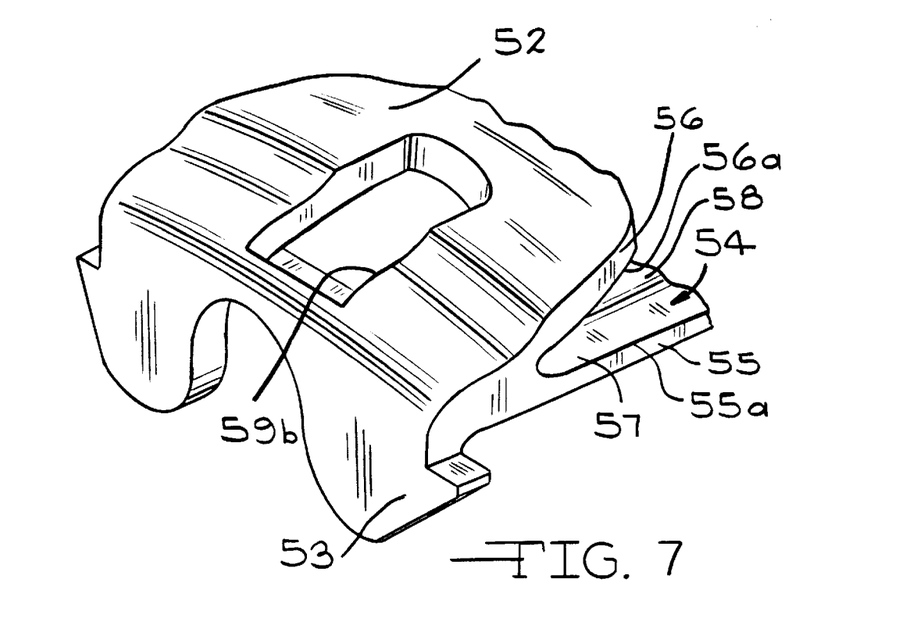
FIG. 7 is a front perspective view of a portion of the caliper illustrated in FIG. 6.

FIGS. 6 and 7 illustrate a second embodiment of an improved structure for a caliper, indicated generally at 50, in accordance with this invention. The caliper 50 is preferably formed from aluminum or alloys thereof and includes an inboard leg portion 51 and an outboard leg portion 53 which are interconnected by an intermediate bridge portion 52. Alternatively, the caliper 50 can be formed from other metals, such as nodular iron, or a combination of two different metals, such as for example, an aluminum metal matrix composite and aluminum. The inboard leg portion 51 of the caliper 50 includes a pair of non-threaded apertures 51a formed therethrough. In a manner similar to that discussed above, the apertures 51a are adapted to receive pins (not shown) for slidably supporting the caliper 50 relative to the anchor plate (not shown).

The caliper 50 includes a pair of cavities or recesses, indicated generally at 54, formed in the opposed lateral sides thereof. Each of the recesses 54 extends from the inboard leg portion 51 to the outboard leg portion 53 of the caliper 50. Each of the recesses 54 defines a lower rib 55, an upper rib 56, a first surface 57, and a second surface 58.

The lower rib 55 has a generally rectangular cross-section of a generally constant thickness and extends uninterrupted from the inboard leg portion 51 to the outboard leg portion 53 of the caliper 50. The upper rib 56 has a generally rectangular cross-section of a generally constant thickness and extends uninterrupted and inwardly from the outboard leg portion 53 toward the inboard leg portion 51 of the caliper 50. Alternatively, the shape and/or the thickness of one or both of the ribs 55 and 56 can be other than illustrated.

The upper rib 56 defines an lower edge 56a, and the lower rib 55 defines an upper edge 55a. The lower edge 56a of the upper rib 56 extends at an acute angle relative to the upper edge 55a of the lower rib 55 and opens outwardly from the outboard leg portion 53 to the inboard leg portion 51 of the caliper 50. Alternatively, the lower edge 56a of the upper rib 56 can extend generally parallel to the upper edge 55a of the lower rib 55. The first surface 57 extends inwardly into the side of the caliper 50 from the upper edge 55a of the lower rib 55. The second surface 58 extends inwardly into the side of the caliper 50 from the lower edge 56a of the upper rib 56. In this embodiment, the upper rib 56 projects outwardly over only a portion of the first surface 57 of the recess 54.

The caliper 50 further includes an opening 59a and an opening 59b formed therein. The opening 59a extends from the inboard leg portion 51 of the caliper 50 into the intermediate bridge portion 52 thereof. The opening 59b is formed in the intermediate bridge portion 52 of the caliper 50 adjacent the outboard leg portion 53 thereof, and extends into the outboard leg portion 53. Alternatively, the shape of one or both of the openings 59a and 59b can be other than illustrated.

Figure 8:
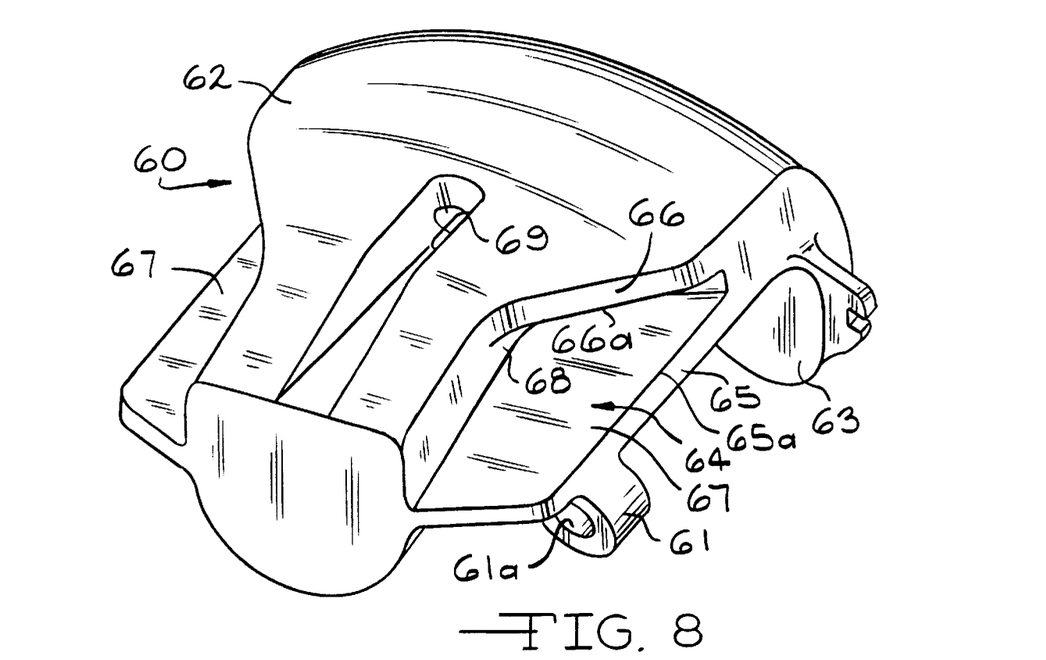
FIG. 8 is a rear perspective view of a third embodiment of an improved structure for a caliper in accordance with this invention.
Figure 9:
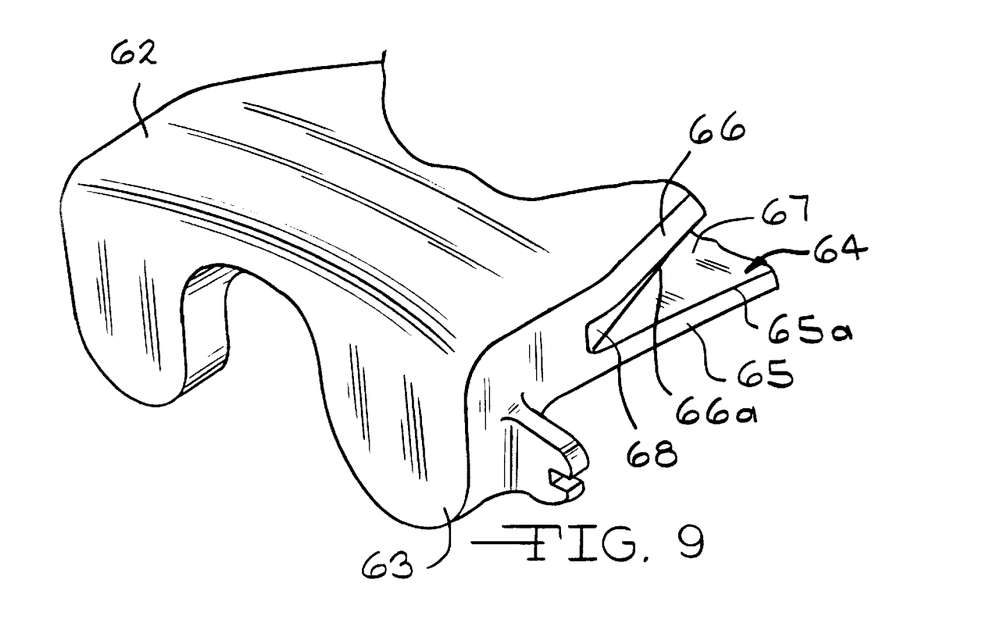
FIG. 9 is a front perspective view of a portion of the caliper illustrated in FIG. 8.

FIGS. 8 and 9 illustrate a third embodiment of a structure for an improved structure for a caliper, indicated generally at 60, in accordance with this invention. The caliper 60 is preferably formed from aluminum or alloys thereof and includes an inboard leg portion 61 and an outboard leg portion 63 which are interconnected by an intermediate bridge portion 62. Alternatively, the caliper 60 can be formed from other metals, such as nodular iron, or a combination of two different metals, such as for example, an aluminum metal matrix composite and aluminum. The inboard leg portion 61 of the caliper 60 includes a pair of non-threaded apertures 61a formed therethrough (only one of such apertures 61a is illustrated). In a manner similar to that discussed above, the apertures 61a are adapted to receive pins (not shown) for slidably supporting the caliper 60 relative to the anchor plate (not shown).

The caliper 60 includes a pair of cavities or recesses, indicated generally at 64, formed in the opposed lateral sides thereof. Each of the recesses 64 extends from the inboard leg portion 61 to the outboard leg portion 63 of the caliper 60. Each of the recesses 64 defines a lower rib 65, an upper rib 66, a first surface 67, and a second surface 68.

The lower rib 65 has a generally rectangular cross-section of a generally constant thickness and extends uninterrupted from the inboard leg portion 61 to the outboard leg portion 63 of the caliper 60. The upper rib 66 has a generally rectangular cross-section of a generally constant thickness and extends uninterrupted and inwardly from the outboard leg portion 63 toward the inboard leg portion 61 of the caliper 60. Alternatively, the shape and/or the thickness of one or both of the ribs 65 and 66 can be other than illustrated.

The upper rib 66 defines an lower edge 66a, and the lower rib 65 defines an upper edge 65a. The lower edge 66a of the upper rib 66 extends at an acute angle relative to the upper edge 65a of the lower rib 65 and opens outwardly from the outboard leg portion 63 to the inboard leg portion 61 of the caliper 60. Alternatively, the lower edge 66a of the upper rib 66 can extend generally parallel to the upper edge 65a of the lower rib 65. The first surface 67 extends inwardly into the side of the caliper 60 from the upper edge 65a of the lower rib 65. The second surface 68 extends inwardly into the side of the caliper 60 from the lower edge 66a of the upper rib 66. In this embodiment, the upper rib 66 projects outwardly over only a portion of the first surface 67 of the recess 64.

The caliper 60 further includes an opening 69 formed therein. The opening 69 extends from the inboard leg portion 61 of the caliper 60 into the intermediate bridge portion 62 thereof. Alternatively, the shape of the opening 69 can be other than illustrated.

Figure 10:
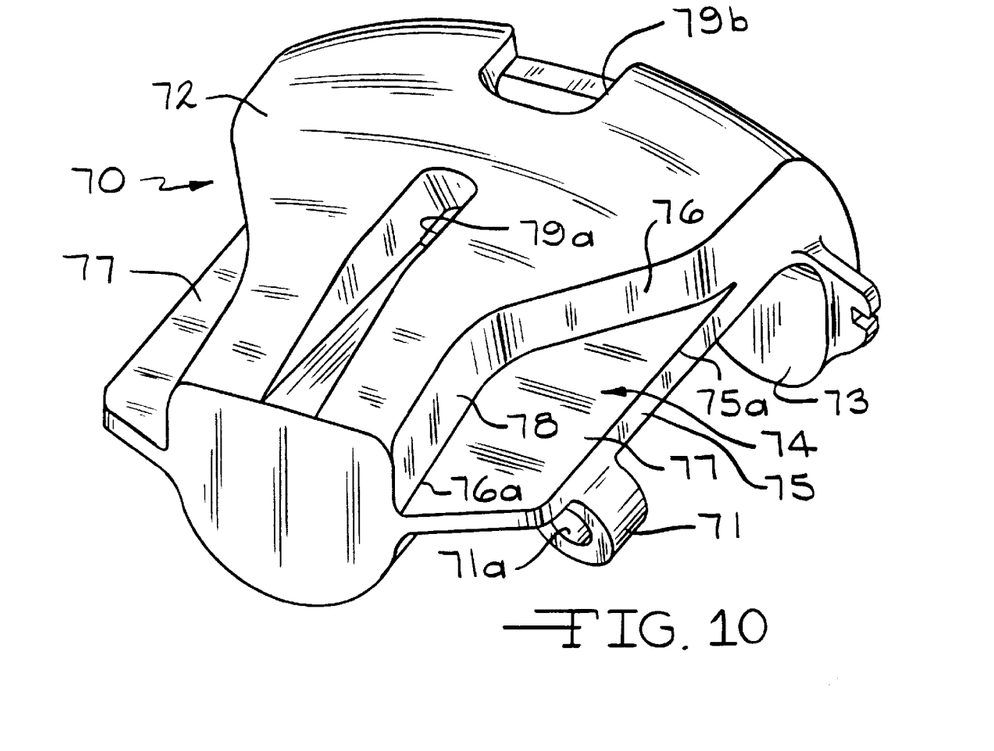
FIG. 10 is a rear perspective view of a fourth embodiment of an improved structure for a caliper in accordance with this invention.
Figure 11:
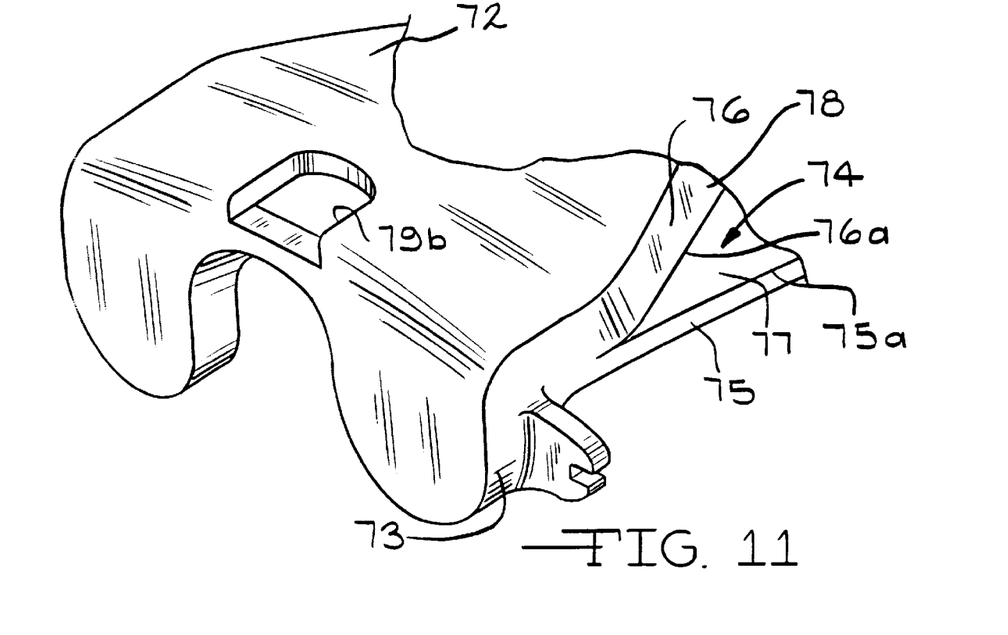
FIG. 11 is a front perspective view of a portion of the caliper illustrated in FIG. 10.

FIGS. 10 and 11 illustrate a fourth embodiment of a structure for an improved structure for a caliper, indicated generally at 70, in accordance with this invention. The caliper 70 is preferably formed from aluminum or alloys thereof and includes an inboard leg portion 71 and an outboard leg portion 73 which are interconnected by an intermediate bridge portion 72. Alternatively, the caliper 70 can be formed from other metals, such as nodular iron, or a combination of two different metals, such as for example, an aluminum metal matrix composite and aluminum. The inboard leg portion 71 of the caliper 70 includes a pair of non-threaded apertures 71a formed therethrough. In a manner similar to that discussed above, the apertures 71a are adapted to receive pins (not shown) for slidably supporting the caliper 70 relative to the anchor plate (not shown).

The caliper 70 includes a pair of cavities or recesses, indicated generally at 74, formed in the opposed lateral sides thereof. Each of the recesses 74 extends from the inboard leg portion 71 to the outboard leg portion 73 of the caliper 70. Each of the recesses 74 defines a lower rib 75, an upper rib 76, and a first surface 77.

The lower rib 75 has a generally rectangular cross-section of a generally constant thickness and extends uninterrupted from the inboard leg portion 71 to the outboard leg portion 73 of the caliper 70. The upper rib 76 has a generally rectangular cross-section of a generally constant thickness and extends uninterrupted and inwardly from the outboard leg portion 73 to the inboard leg portion 71 of the caliper 70. The upper rib 76 defines a second surface 78. Alternatively, the shape and/or the thickness of one or both of the ribs 75 and 76 can be other than illustrated.

The upper rib 76 defines and a lower edge 76a, and the lower rib 75 defines an upper edge 75a. The lower edge 76a of the upper rib 76 extends generally parallel to the upper edge 75a of the lower rib 75. Alternatively, the lower edge 76a of the upper rib 76 can extend at an angle relative to the upper edge 75a of the lower rib 75. The first surface 77 extends inwardly into the side of the caliper 70 from the upper edge 75a of the lower rib 75. In this embodiment, the upper rib 76 does not project outwardly over any portion of the surface 77 of the recess 74.

The caliper 70 further includes a pair of openings 79a and 79b formed therein. The opening 79a extends from the inboard leg portion 71 of the caliper into the intermediate bridge portion 72 thereof. The opening 79b is formed in the intermediate bridge portion 72 of the caliper 70 adjacent the outboard leg portion 73 thereof, and extends into the outboard leg portion 73. Alternatively, the shape of one or both of the openings 79a and 79b can be other than illustrated.

One advantage of this invention is that the recesses 44, 54, 64, and 74, or the recesses 44, 54, 64, and 74 and the opening/openings 49a and 49b, 59a and 59b, 69, and 79a and 79b, provided in the respective calipers 40, 50, 60, and 70, are effective to optimize the stiffness to weight ratio of the caliper. As a result, a relatively lightweight caliper structure is provided which also provides sufficient stiffness for braking performance.

While the calipers 40, 50, 60, and 70 of this invention have been illustrated and described in connection with a "sliding" caliper type of disc brake assembly, the invention may be used with other types of brake assemblies. For example, the invention may be used in connection with a "fixed" caliper type of disc brake assembly (not shown), or may be used in connection with a drum-in-hat type of disc brake assembly (not shown), wherein the disc brake assembly includes a disc service brake and a drum parking and emergency brake.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A caliper adapted for use in a disc brake assembly comprising:

a caliper including an inboard leg portion and an outboard leg portion interconnected by an intermediate bridge portion, said intermediate bridge portion defining a pair of opposed lateral sides, said intermediate bridge portion including an outer surface; and a non-through recess provided in at least one of said lateral sides of said intermediate bridge portion of said caliper, said non-through recess including a first surface, a second surface, and a lower rib, said lower rib extending from about said outboard leg portion to about said inboard leg portion of said caliper and including an upper edge, said first surface extending from said upper edge of said lower rib inwardly into said intermediate bridge portion of said caliper, said second surface extending inwardly into said caliper from said outer surface of said intermediate bridge portion and oriented generally perpendicular relative to said first surface.

2. The caliper defined in claim 1 wherein said caliper is formed from aluminum.

3. The caliper defined in claim 1 wherein said non-through recess extends generally from about said inboard leg portion to about said outboard leg portion of said caliper.

4. The caliper defined in claim 1 wherein said non-through recess further includes an upper rib,.

5. The caliper defined in claim 4 wherein said upper rib extends from about said outboard leg portion to about said inboard leg portion of said caliper.

6. The caliper defined in claim 4 wherein said upper rib extends uninterrupted and inwardly from about said outboard leg portion to about said inboard leg portion of said caliper.

7. The caliper defined in claim 4 wherein said upper rib is located at an acute angle relative to said lower rib.

8. The caliper defined in claim 4 wherein said upper rib projects over at least a portion of said non-through recess.

9. The caliper defined in claim 1 and further including at least one opening formed therein, said opening extending into at least a portion of said intermediate bridge portion thereof.

10. The caliper defined in claim 9 and further including a first opening formed therein, said first opening extending from about said inboard leg portion of said caliper into said intermediate bridge portion, and a second opening formed therein, said second opening extending from about said outboard leg portion of said caliper into said intermediate bridge portion thereof.

11. A disc brake caliper assembly comprising:

a rotor adapted to be connected to a vehicle wheel for rotation therewith;

a caliper including an inboard leg, an outboard leg, and an intermediate bridge interconnecting said inboard leg portion to said outboard leg portion, said intermediate bridge portion defining a pair of opposed lateral sides, at least one of said lateral sides having a non-through recess formed therein, said non-through recess including a first surface, a second surface, and a lower rib, said lower rib extending from about said outboard leg portion to about said inboard leg portion of said caliper and including an upper edge, said first surface extending from said upper edge of said lower rib inwardly into said intermediate bridge portion of said caliper, said second surface extending inwardly into said caliper from said outer surface of said intermediate bridge portion and oriented generally perpendicular relative to said first surface, said intermediate bridge portion including an outer surface;

a pair of brake shoes carried by said disc brake assembly and disposed on opposite sides of the rotor; and actuation means carried by said caliper for selectively moving said brake shoes between a non-braking position, wherein said brake shoes are adapted to be spaced apart from the sides of the rotor, and a braking position, wherein said brake shoes are adapted to frictionally engage the sides of the rotor.

12. The disc brake caliper assembly defined in claim 11 wherein said caliper is formed from aluminum.

13. The disc brake caliper assembly defined in claim 11 wherein said non-through recess extends generally from about said inboard leg portion to about said outboard leg portion of said caliper.

14. The disc brake caliper assembly defined in claim 11 wherein said non-through recess further includes an upper rib.

15. The disc brake caliper assembly defined in claim 14 wherein said upper rib extends from about said outboard leg portion to about said inboard leg portion of said caliper.

16. The disc brake caliper assembly defined in claim 14 wherein said upper rib extends uninterrupted and inwardly from about said outboard leg portion to about said inboard leg portion of said caliper.

17. The disc brake caliper assembly defined in claim 14 wherein said upper rib is located at an acute angle relative to said lower rib.

18. The disc brake caliper assembly defined in claim 14 wherein said upper rib projects over at least a portion of said non-through recess.

19. A caliper adapted for use in a disc brake assembly comprising:

a caliper including an inboard leg portion and an outboard leg portion interconnected by an intermediate bridge portion, said intermediate bridge portion defining a pair of opposed lateral sides, said intermediate bridge portion including an outer surface; and a non-through recess provided in at least one of said lateral sides of said intermediate bridge portion of said caliper, said non-through recess including a first surface, a second surface, a lower rib and an upper rib, said lower rib extending from about said outboard leg portion to about said inboard leg portion of said caliper and including an upper edge, said upper rib extending from about said outboard leg portion toward said inboard leg portion and including a lower edge, said first surface extending from said upper edge of said lower rib inwardly into said intermediate bridge portion of said caliper, said second surface extending from said lower edge inwardly of said upper rib into said caliper from said outer surface of said intermediate bridge portion, said upper rib projecting over at least a portion of said first surface of said non-through recess only at said outboard leg portion thereof.

* * * * *